United States Patent
Rosenbaum et al.

(10) Patent No.: US 9,925,939 B2
(45) Date of Patent: *Mar. 27, 2018

(54) PEDESTRIAN COLLISION WARNING SYSTEM

(71) Applicant: MOBILEYE VISION TECHNOLOGIES LTD., Jerusalem (IL)

(72) Inventors: Dan Rosenbaum, Jerusalem (IL); Amiad Gurman, Elkana (IL); Yonatan Samet, Jerusalem (IL); Gideon P. Stein, Jerusalem (IL); David Aloni, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,198

(22) Filed: Dec. 29, 2015

(65) Prior Publication Data

US 2016/0107595 A1 Apr. 21, 2016

Related U.S. Application Data

(63) Continuation of application No. 13/455,719, filed on Apr. 25, 2012, now Pat. No. 9,233,659.
(Continued)

(51) Int. Cl.
*G06T 7/269* (2017.01)
*B60R 21/013* (2006.01)
(Continued)

(52) U.S. Cl.
CPC .............. *B60R 21/013* (2013.01); *B60R 1/00* (2013.01); *B60W 30/0956* (2013.01);
(Continued)

(58) Field of Classification Search
CPC combination set(s) only.
See application file for complete search history.

(56) References Cited

U.S. PATENT DOCUMENTS

| 4,257,703 A | 3/1981 | Goodrich |
| 4,931,937 A | 6/1990 | Kakinami et al. |

(Continued)

FOREIGN PATENT DOCUMENTS

| EP | 0465375 A2 | 1/1992 |
| EP | 1806595 B1 | 4/2009 |

(Continued)

OTHER PUBLICATIONS

"iOnRoad Augmented Driving App Too Smart for The iPhone", Press Release, Picitup Inc., Oct. 31, 2011.
(Continued)

*Primary Examiner* — Sath V Perungavoor
*Assistant Examiner* — Janese Duley
(74) *Attorney, Agent, or Firm* — Morrison & Foerster LLP

(57) ABSTRACT

A method is provided for preventing a collision between a motor vehicle and a pedestrian. The method uses a camera and a processor mountable in the motor vehicle. A candidate image is detected. Based on a change of scale of the candidate image, it may be determined that the motor vehicle and the pedestrian are expected to collide, thereby producing a potential collision warning. Further information from the image frames may be used to validate the potential collision warning. The validation may include an analysis of the optical flow of the candidate image, that lane markings prediction of a straight road, a calculation of the lateral motion of the pedestrian, if the pedestrian is crossing a lane mark or curb and/or if the vehicle is changing lanes.

16 Claims, 15 Drawing Sheets

Related U.S. Application Data

(60) Provisional application No. 61/479,485, filed on Apr. 27, 2011.

(51) Int. Cl.
*B60W 30/095* (2012.01)
*B60R 1/00* (2006.01)
*G06K 9/00* (2006.01)

(52) U.S. Cl.
CPC .......... *G06K 9/00805* (2013.01); *G06T 7/269* (2017.01); *B60R 2300/8033* (2013.01); *B60W 2420/42* (2013.01); *G06T 2207/10016* (2013.01); *G06T 2207/30196* (2013.01); *G06T 2207/30256* (2013.01); *G06T 2207/30261* (2013.01)

(56) References Cited

U.S. PATENT DOCUMENTS

| | | | |
|---|---|---|---|
| 4,969,036 | A | 11/1990 | Bhanu et al. |
| 5,010,457 | A | 4/1991 | Ohmamyuda et al. |
| 5,249,157 | A | 9/1993 | Taylor |
| 5,259,040 | A | 11/1993 | Hanna |
| 5,502,432 | A | 3/1996 | Ohmamyuda et al. |
| 5,867,256 | A | 2/1999 | Van Rheeden |
| 6,246,961 | B1 | 6/2001 | Sasaki et al. |
| 6,704,621 | B1 | 3/2004 | Stein et al. |
| 7,113,867 | B1* | 9/2006 | Stein .................. G06K 9/00805 701/301 |
| 8,082,101 | B2 | 12/2011 | Stein et al. |
| 2004/0057600 | A1* | 3/2004 | Niwa ..................... B60R 25/104 382/103 |
| 2004/0175019 | A1 | 9/2004 | Howard |
| 2008/0199050 | A1 | 8/2008 | Koitabashi |
| 2010/0082195 | A1 | 4/2010 | Lee et al. |
| 2010/0191391 | A1* | 7/2010 | Zeng ..................... G01S 13/723 701/1 |
| 2011/0087433 | A1* | 4/2011 | Yester .................... G08G 1/163 701/301 |
| 2011/0307175 | A1* | 12/2011 | Gandhi .................. G08G 1/166 701/301 |
| 2012/0140076 | A1 | 6/2012 | Rosenbaum et al. |

FOREIGN PATENT DOCUMENTS

| | | |
|---|---|---|
| EP | 2249310 A1 | 11/2010 |
| EP | 2463843 A3 | 7/2013 |
| WO | 2001/039018 A1 | 5/2001 |
| WO | 2005/098782 A1 | 10/2005 |

OTHER PUBLICATIONS

"iOnRoad Car Mount installation", Screen capture, iOn Road YouTube Channel page, <http://www.youtube.com/watch?v=bZbolrpXUqc>, Apr. 23, 2014.
"iOnRoad AR Collision Warning", Screen capture, iOn Road YouTube Channel page, <http://www.youtube.com/watch?v=hEKe4wR262I>, Apr. 23, 2014.
"iOnRoad Demo-Israel Mobile Summit", Screen capture, iOn Road YouTube Channel page, <http://www.youtube.com/watch?v=v5EBJ3Jw5Cg>, Apr. 23, 2014.
"iOnRoad Night Driving", Screen capture, iOn Road YouTube Channel page, <http://www.youtube.com/watch?v=uHzu280wM0>, Apr. 23, 2014.
"iOnRoad AR collision warning", Screen capture, iOn Road YouTube Channel page, <http://www.youtube.com/watch?v=SOXKegvSN5U>, Apr. 23, 2014.
"iOnRoad: Smarter Phones, Smarter Driving", Screen capture, iOn Road YouTube Channel page, <http://www.youtube.com/watch?v=awhfkDzglsA>, Apr. 23, 2014.
Amended Order Dismissing Request to Take Evidence Abroad, *Mobileye, Inc. et al.* v. *Picitup Corp., et al.*, Case No. 12-cv-1994, United States District Court, Southern District of New York, Jun. 19 2012 2 pages.
Amendment and Response to Office Action in Reexamination No. 95/002,012, dated Oct. 9, 2012, 38 pages.
Answer to Amended Complaint filed in *Mobileye, Inc.* v. *Picitup Corp.*, 1:12-cv-01994 (JSR), S.D.N.Y, Jul. 30, 2012, 24 pages.
Bootsma et al., "Predictive Visual Information Sources for the Regulation of Action with Special Emphasis on Catching and Hitting", Advances in Psychology, vol. 85, 1992, pp. 285-314.
Brauckmann et al., "Towards All Around Automatic Visual Obstacle Sensing for Cars", Proceedings of the Intelligent Vehicles '94 Symposium, 1994, pp. 79-84.
Burger et al., "Estimating 3D Egomotion from Perspective Image Sequence", IEEE Transactions on Pattern Analysis and Machine Intelligence, vol. 12, No. 11, 1990, pp. 1040-1058.
Burlina et al., "Time-to-X: Analysis of Motion Through Temporal Parameters", Computer Vision Laboratory Center for Automation Research, University of Malyland, College Park, MD, USA, Jul. 1994, 40 pages.
Cipolla et al., "Surface Orientation and Time to Contact from Image Divergence and Deformation", Computer Vision—European Conference on Computer Vision, 1992, 164 pages.
Complaint filed in *Mobileye, Inc.* v. *Picitup Corp.*, 1:12-cv-01994 (JSR) S.D.N.Y., Mar. 16, 2012, 20 pages.
Dagan et al., "Forward Collision Warning with a Single Camera", IEEE Intelligent Vehicles Symposium, 2004, pp. 37-42.
Defendants' Amended Statement of Undisputed Material Facts in Support of Their Motion for Summary Judgment Pursuant to 35 U.S.C. 101—Lack of Patentable Subject Matter, *Mobileye, Inc. et al.* v. *Picitup Corp., et al.*, Case No. 12-cv-1994, United States District Court, Southern District of New York, Sep. 19, 2012, 13 pages.
Defendant's Answer and Affirmative Defenses, *Mobileye, Inc. et al.* v. *Picitup Corp., et al.*, Case No. 12-cv-1994, United States District Court, Southern District of New York, Jun. 11, 2012, 16 pages.
Defendants' Memorandum in Support of Their Motion for Summary Judgment Pursuant to 35 U.S.C. 101—Lack of Patentable Subject Matter, *Mobileye, Inc. et al.* v. *Picitup Corp., et al.*, Case No. 12-cv-1994, United States District Court, Southern District of New York, Sep. 19, 2012, 27 pages.
Exhibit 2 to McNamee Declaration, Transaction History for Inter Partes Reexamination of U.S. Pat. No. 7,133,867, filed in *Mobileye, Inc.* v. *Picitup Corp.*, 1:12- cv-01994 (JSR) S.D.N.Y, Oct. 26, 2012, 2 pages.
Exhibit 26 to Defendants' Rule 56.1 Statement, In Support of Their Motions for Summary Judgment of Non-Infringement and Invalidity of U.S. Pat. No. 6,704,621, 7,113,867, and 8,082,101, Transmittal of Communication to Third Party Requester, Inter Partes reexamination, Order Granted Request, dated Aug. 6, 2012, filed in *Mobileye, Inc. et al.* v. *Picitup Corp., et al.*, Case No. 12-cv-1994, US District Court, Southern District of New York, 21 Pages.
Exhibit 3 to McNamee Declaration, USPTO Memorandum attaching Interim Guidance for Determining Subject Matter Eligibility for Process Claims in View of *Bilski* v. *Kappos*, Jul. 27, 2010, filed in *Mobileye, Inc.* v. *Picitup Corp.*, 1:12-cv-01994 (JSR) S.D.N.Y., 11 pages.
Extended European Search Report (includes European Search Report and Search Opinion) received for European Patent Application No. 06124013.1, dated Apr. 11, 2007, 6 pages.
Extended European Search Report Received for European Patent Application No. 11275158.1, dated Jun. 5, 2013, 8 pages.
File History of U.S. Appl. No. 09/723,755, filed in *Mobileye, Inc.* v. *Picitup Corp.*, 1:12-cv-01994 (JSR) S.D.M.Y., 285 pages.
File History of U.S. Appl. No. 10/599,667, filed in *Mobileye, Inc.* v. *Picitup Corp.*, 1:12-cv-01994 (JSR) S.D.N.Y., 251 pages.
Final Office Action Received for U.S. Appl. No. 13/455,719, dated Feb. 24, 2015, 17 pages.
Giachetti et al., "The Use of Optical Flow for Road Navigation", IEEE Transactions on Robotics and Automation, 1998, pp. 34-48.
Horn et al., "Determining Optical Flow", Technical Symposium East. International Society for Optics and Photonics, 1981.

(56) References Cited

OTHER PUBLICATIONS

Horn et al., "Time to Contact Relative to a Planar Surface", IEEE Intelligent Vehicles Symposium, pp. 68-74 2007.
Irani et al., "Direct recovery of planar-parallax from multiple frames", IEEE Transactions on Pattern Analysis and Machine Intelligence, 2002, pp. 1528-1534.
Lee et al., "Visual Timing in Hitting an Accelerating Ball", Quart. J. Exp. Psychol., 35A, 1983, pp.333-346.
Lee, Dn., "A Theory of Visual Control of Braking based on information about Time-to-Collision", Perception 5, 1976, pp. 437-459.
Matthews, "Visual Collision Avoidance", University of Southampton, Oct. 1994, 51 pages.
Meer, Peter, "Robust Techniques for Computer Vision", Emerging Topics in Computer Vision, 2004, pp. 107-190.
Mobileye, "C2-170 Driver Assistance System User Manual", © 2007-2009.
Muller et al., "Time to Contact Estimation Using Interest Points", Proc. 12th IEEE Conference on Intelligent Transportation Systems Oct. 2009, pp. 1-6 pages.
Non Final Office Action received for U.S. Appl. No. 13/455,719, dated Jul. 9, 2014, 9 pages.
Notice of Allowance Received for U.S. Appl. No. 13/455,719, dated Sep. 8, 2015, 8 pages.
Office Action received for European Patent Application No. 11275158.1, dated Feb. 18, 2014, 8 pages.
Protective Order, *Mobileye, Inc. et al. v. Picitup Corp., et al.*, Case No. 12-cv-1994, United States District Court, Southern District of New York, Jun. 14, 2012, 16 pages.
Ran, et al., "Development of Vision-Based Vehicle Detection and Recognition System for Intelligent Vehicles", TRB Annual Meeting, Nov. 16, 1998, pp. 1-12.
Registration No. 3,150,324, U.S. Certificate of Registration, Oct. 3, 2006, 1 page.
Request for Inter Partes Reexamination received for U.S. Pat. No. 7,133,867 Pursuant to 37 C.F.R. Sctn.1.915 dated Jun. 6, 2012, 95 pages.
Roberts, "Attentive Visual Tracking and Trajectory Estimation for Dynamic Scene Segmentation", University of Southampton, Doctoral Thesis, Dec. 1994, 212 pages.
Sahli, et al., "A Kalman Filter-Based Update Scheme for Road Following", Proceedings of IAPR Workshop on Machine Vision Applications, 1996, pp. 1-9.
Schwarzinger et al., "Vision-based Car-following: Detection, Tracking, and Identification", Proceedings of the Intelligent Vehicles '92 Symposium, 1992, pp. 24-29.
Screen capture of Picitup YouTube Channel page, available at: <http://www.youtube.com/user/PicitupCorp/videos?view=0, Apr. 23, 2014.
Shashua et al., File History of U.S. Appl. No, 60/167,587, dated Nov. 26, 1999.
Shashua, et al., File History of U.S. Appl. No. 60/230,166, dated Sep. 1, 2000.
Stein, et al., "A robust method for computing vehicle ego-motion", Proceedings of the IEEE Intelligent Vehicles Symposium, 2000, pp. 362-368.
Suzuki et al., "Measurement of Vehicle Motion and Orientation using Optical Flow", Proceedings 1999 IEEE/IEEJ/JSAI International Conference on Intelligent Transportation Systems, 1999, pp. 25-30.
United States District Court Southern District of New York, Opinion and Order, Jed S. Rakoff, U.S.D.J., Opinion and Order dated Mar. 5, 2013, 47 pages, filed in *Mobileye, Inc. v. Picitup Corp.*, 1:12-cv-01994 (JSR) S.D.N.Y.
United States Patent and Trademark Office, Paper No. 17, Date: Aug. 27, 2013, Decision Institution of Inter Partes Review 37 C.F.R. § 42.108.
Zielke et al., "Intensity and Edge-Based Symmetry Detection Applied to Car-Following", Lecture Notes in Computer Science, vol. 588, Computer-Vision-ECCV, 1992, 9 pages.

\* cited by examiner

32 Fig. 3a

PEDESTRIAN COLLISION WARNING SYSTEM

CROSS REFERENCE TO RELATED APPLICATIONS

This application is a continuation of U.S. Application Ser. No. 13/455,719, filed Apr. 25, 2012, now U.S. Pat. No. 9,233,659, issued Jan. 12, 2016, which claims priority to and the benefit of U.S. Provisional Application No. 61/479,485, filed Apr. 27, 2011, each of which is hereby incorporated by reference in its entirety.

BACKGROUND

1. Technical Field

The present invention relates to a driver assistance system which provides a collision warning with respect to a pedestrian.

2. Description of Related Art

During the last few years camera based driver assistance systems (DAS) have been entering the market; including lane departure warning (LDW), Automatic High-beam Control (AHC), pedestrian recognition, and forward collision warning (FCW).

Lane departure warning (LDW) systems are designed to give a warning in the case of unintentional lane departure. The warning is given when the vehicle crosses or is about to cross the lane marker. Driver intention is determined based on use of turn signals, change in steering wheel angle, vehicle speed and brake activation.

In image processing, the Moravec corner detection algorithm is probably one of the earliest corner detection algorithms and defines a corner to be a point with low self-similarity. The Moravec algorithm tests each pixel in the image to see if a corner is present, by considering how similar a patch centered on the pixel is to nearby largely overlapping patches. The similarity is measured by taking the sum of squared differences squared differences (SSD) between the two patches. A lower number indicates more similarity. An alternative approach to corner detection in images is based on a method proposed by Harris and Stephens, which is an improvement of the method by Moravec. Harris and Stephens improved upon Moravec's corner detector by considering the differential of the corner score with respect to direction directly, instead of using nearby patches of Moravec.

In computer vision, a widely used differential method for optical flow estimation was developed by Bruce D. Lucas and Takeo Kanade. The Lucas-Kanade method assumes that the flow is essentially constant in a local neighborhood of the pixel under consideration, and solves the basic optical flow equations for all the pixels in that neighborhood, by the least squares criterion. By combining information from several nearby pixels, the Lucas-Kanade method can often resolve the inherent ambiguity of the optical flow equation. It is also less sensitive to image noise than point-wise methods. On the other hand, since it is a purely local method, it cannot provide flow information in the interior of uniform regions of the image.

BRIEF SUMMARY

Various methods are provided for signaling a forward collision warning using a camera and a processor mountable in a motor vehicle.

According to a feature of the present invention, a method is provided for preventing a collision between a motor vehicle and a pedestrian using a camera and a processor mountable in a motor vehicle. The processor may be operably connectable to the camera and the processor may be configured to capture multiple image frames from the camera of the environment of the motor vehicle in the field of view of the camera. The method detects an image patch in at least one of the image frames. The image patch may include a candidate image of a pedestrian in the field of view of the camera. Detection of the candidate image may be validated by analyzing optical flow between the image frames of the image patch. A collision warning or a collision prevention control signal may be provided when the analyzed optical flow is consistent with an upright pedestrian. Optical flow may be tracked between the image frames of multiple image points of the image patch and the image points are fit to a model. The model may be a road surface model or a vertical surface model. Based on the best fit of the image points to the model, a time-to-collision (TTC) may be determined if a collision is expected. The candidate image may be verified as an image of the upright pedestrian and not an object in the road surface when the best fit model is the vertical surface model.

According to features of the present invention, a method is provided for preventing a collision between a motor vehicle and a pedestrian. The method uses a camera and a processor mountable in the motor vehicle. The processor may be operably connectable to the camera and the processor may be configured to capture image frames from the camera of the environment of the motor vehicle in the field of view of the camera. A candidate image is detected which may include the pedestrian in the field of view of the camera. Based on a change of scale of the candidate image, it may be determined that the motor vehicle and the pedestrian are expected to collide, thereby producing a potential collision warning. Further information from the image frames may be used to validate the potential collision warning. The validation is directed to eliminate or reduce false collision warnings with pedestrians. A collision warning signal or a collision control signal may be provided (or inhibited) based upon the validation (or non-validation) of the potential collision warning. The validation may include an analysis of the optical flow of the candidate image, that lane markings prediction of a straight road, a calculation of the lateral motion of the pedestrian, if the pedestrian is crossing a lane mark or curb and/or if the vehicle is changing lanes.

The validation may include predicting at least two likely paths of the vehicle, computing a region of intersection of the likely paths, determining whether the pedestrian is inside or moving towards said region of intersection; and the collision warning signal or the collision control signal may be provided when the pedestrian is inside or moving towards the region of intersection. The likely paths may include: a path of the present lane of travel of the vehicle as indicated by lane markings or curb, a path of travel to follow a preceding vehicle, a path which is straight ahead and a path which avoids the vehicle going up on a curb.

The validation may also include selection of an image patch in an image frame corresponding to where the motor vehicle will be, in a predetermined time interval; the image patch may be monitored and if the pedestrian is imaged in the image patch, then the collision warning signal or the collision prevention control signal may be provided. The determination that the motor vehicle and the pedestrian are expected to collide may include calculating a first time-to-collision based on the change of scale. A second time-tocollision based on the further information from the image frames may be calculated and the first and second times to collision compared. The collision warning signal or the collision control signal provided, may be performed when the absolute value difference between the first and second time-to-collision is less than a threshold.

According to features of the present invention a system operable to prevent a collision between a motor vehicle and a pedestrian is provided. The system uses a camera and a processor mountable in the motor vehicle. The processor may be operably connectable to the camera and the processor and may be configured to capture image frames from the camera of the environment of the motor vehicle in the field of view of the camera. The system may be operable to detect a candidate image. The candidate image may include the pedestrian in the field of view of the camera. Based on a change of scale of the candidate image, the system may be operable to determine that the motor vehicle and the pedestrian are expected to collide, thereby producing a potential collision warning. The system may be operable to use further information from the image frames to give a validation of the potential collision warning and provide a collision warning signal or a collision control signal upon the validation. The validation may include analyzing optical flow of the candidate image, determining that lane markings predict a straight road, calculating lateral motion of the pedestrian, determining if the pedestrian is crossing a lane mark or curb or determining if the vehicle is changing lanes.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 3a shows an image frame of an upright surface (the back of a van), according to a feature of the present invention.

DETAILED DESCRIPTION

Figure 1A:
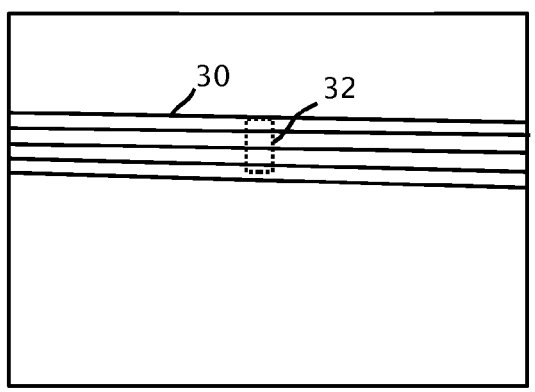
FIGS. 1a and 1b show schematically two images captured from a forward looking camera mounted inside a vehicle as the vehicle approaches a metal fence, according to a feature of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, embodiments of the present invention are directed to a forward collision (FCW) system. According to U.S. Pat. No. 7,113,867, a image of lead vehicle is recognized. The width of the vehicle may be used to detect a change in scale or relative scale S between image frames and the relative scale is used for determining time to contact. Specifically, for example width of the lead vehicle, have a length (as measured for example in pixels or millimeters) in the first and second images represented by w(t1) and w(t2) respectively. Then, optionally the relative scale is $S(t)=w(t2)/w(t1)$.

According to the teachings of U.S. Pat. No. 7,113,867, the forward collision (FCW) system depends upon recognition of an image of an obstruction or object, e.g. lead vehicle for instance, as recognized in the image frames. In the forward collision warning system, as disclosed in U.S. Pat. No. 7,113,867, the scale change of a dimension, e.g width, of the detected object e.g. vehicle is used to compute time-to-contact (TTC). However, the object is first detected and segmented from the surrounding scene. The present application describes a system in which optical flow is used to determine the time to collision TTC and/or likelihood of collision and issue an FCW warning if required. Optical flow causes the looming phenomenon in perception of images which appear larger as objects being imaged get closer. Object detection and/or recognition may be performed or object detection and/or recognition may be avoided, according to different features of the present invention.

The looming phenomenon has been widely studied in biological systems. Looming appears to be a very low level visual attention mechanism in humans and can trigger instinctive reactions. There have been various attempts in computer vision to detect looming and there was even a silicon sensor design for detection of looming in the pure translation case.

Looming detection may be performed in real world environments with changing lighting conditions, complex scenes including multiple objects and host vehicle which includes both translation and rotation.

The term "relative scale" or "change of scale" as used herein refers to the relative size increase (or decrease) of an image patch in an image frame and a corresponding image patch in a subsequent image frame.

Figure 9:
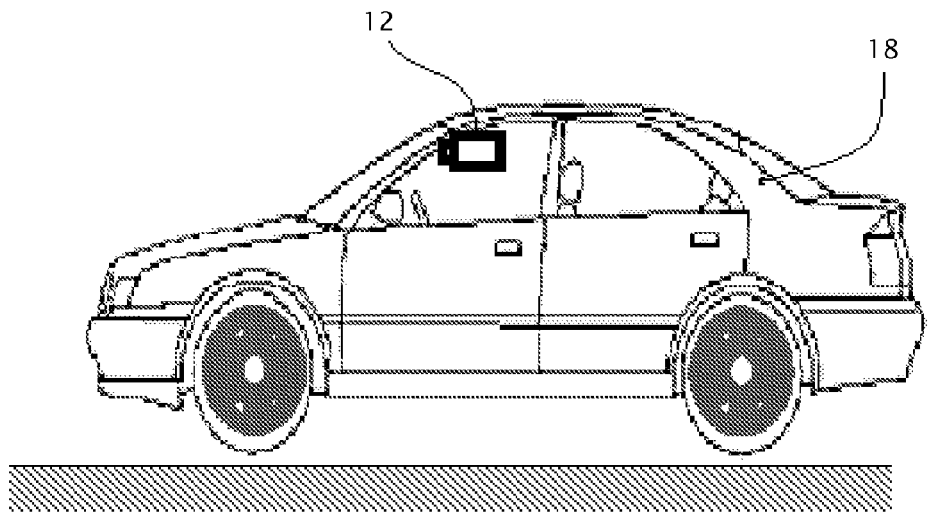
FIGS. 9 and 10 illustrate a system which includes a camera or image sensor mounted in a vehicle, according to an aspect of the present invention.
Figure 10:
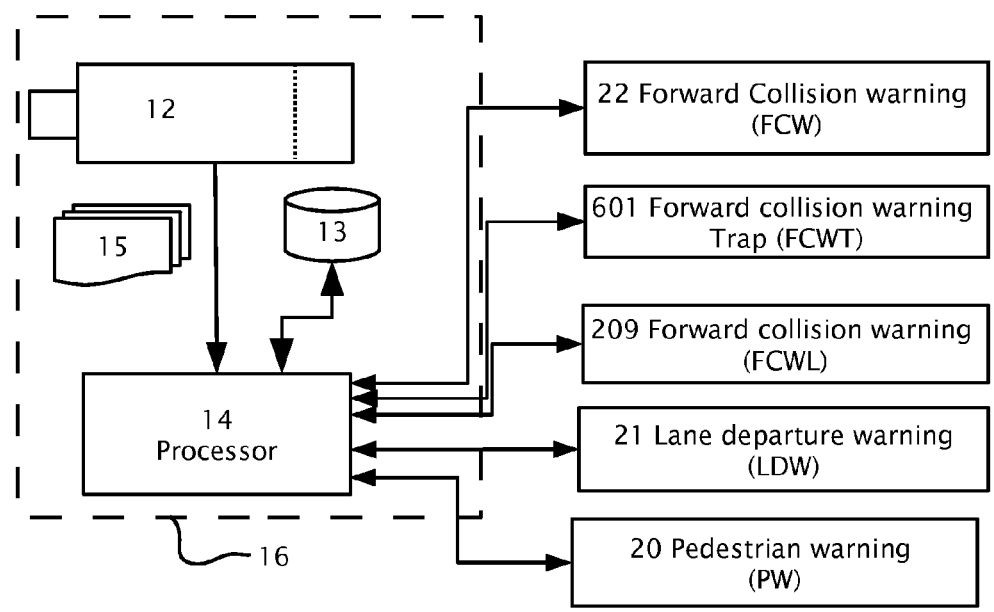

Reference is now made to FIGS. 9 and 10 which illustrate a system 16 including a camera or image sensor 12 mounted in a vehicle 18, according to an aspect of the present invention. Image sensor 12, imaging a field of view in the forward direction delivers images in real time and the images are captured in a time series of image frames 15. An image processor 14 may be used to process image frames 15 simultaneously and/or in parallel to serve a number of driver assistance systems. The driver assistance systems may be implemented using specific hardware circuitry with on board software and/or software control algorithms in storage 13. Image sensor 12 may be monochrome or black-white, i.e. without color separation or image sensor 12 may be color sensitive. By way of example in FIG. 10, image frames 15 are used to serve pedestrian warning (PW) 20, lane departure warning (LDW) 21, forward collision warning (FCW) 22 based on target detection and tracking according to the teachings of U.S. Pat. No. 7,113,867, forward collision warning based on image looming (FCWL) 209 and/or forward collision warning 601 based on an FCW trap (FCWT) 601. Image processor 14 is used to process image frames 15 to detect looming in an image in the forward field of view of camera 12 for forward collision warning 209 based on image looming and FCWT 601. Forward collision warning 209 based on image looming and forward collision warning based on traps (FCWT) 601 may be performed in parallel with conventional FCW 22 and with the other driver assistance functions, pedestrian detection (PW) 20, lane departure warning (LDW) 21, traffic sign detection, and ego motion detection. FCWT 601 may be used to validate the conventional signal from FCW 22. The term "FCW signal" as used herein refers to a forward collision warning signal. The terms "FCW signal", "forward collision warning", and "warning" are used herein interchangeably.

Figure 1B:
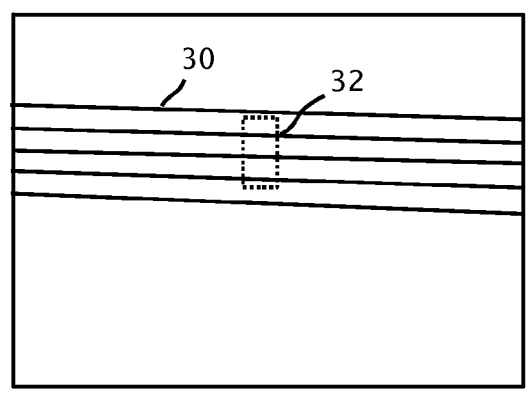

A feature of the present invention is illustrated in FIGS. 1a and 1b which show an example of optical flow or looming. Two images captured are shown from a forward looking camera 12 mounted inside a vehicle 18 as vehicle 18 approaches a metal fence 30. The image in FIG. 1a shows a field and a fence 30. The image in FIG. 1b shows the same features with vehicle 18 closer if a small rectangular p 32 of the fence (marked in dotted line) is viewed it may be possible see that the horizontal lines 34 appear to spread out as vehicle 18 approaches fence 30 in FIG. 1b.

Figure 2A:
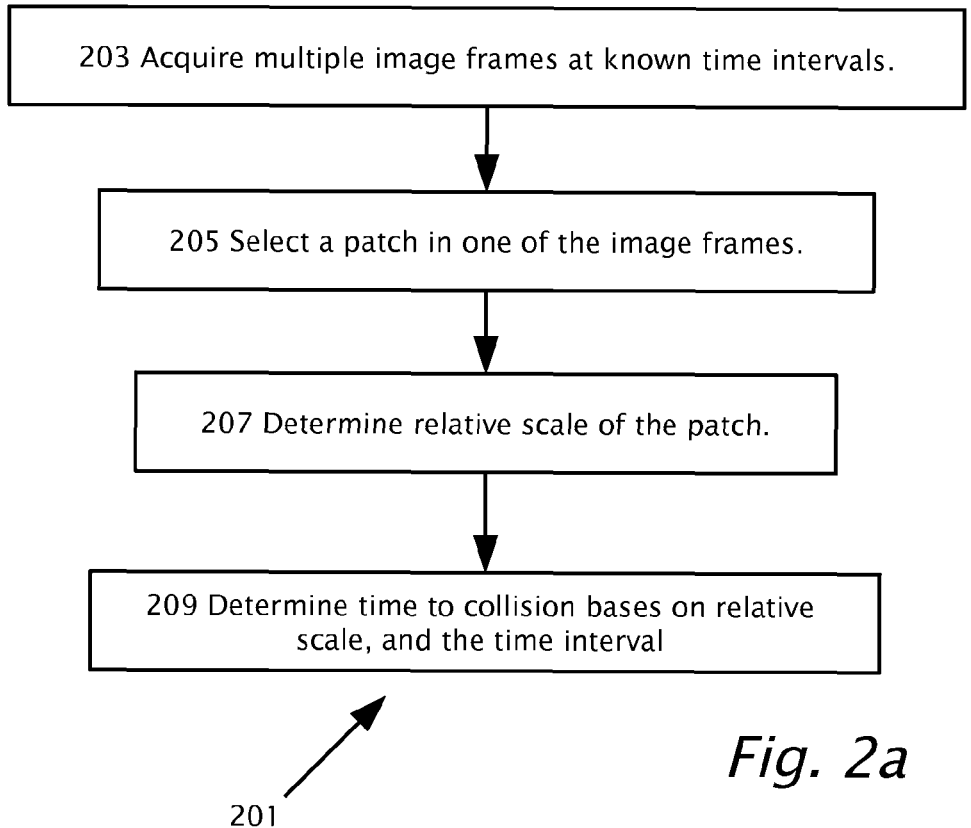
FIG. 2a shows a method for providing a forward collision warning using a camera mounted in host vehicle, according to a feature of the present invention.

Reference is now made to FIG. 2a which shows a method 201 for providing a forward collision warning 209 (FCWL 209) using camera 12 mounted in host vehicle 18, according to a feature of the present invention. Method 201 does not depend on object recognition of an object in the forward view of vehicle 18. In step 203 multiple image frames 15 are acquired by camera 12. The time interval between capture of image frames is zit. A patch 32 in image frame 15 is selected in step 205 and a relative scale (S) of patch 32 is determined in step 207. In step 209, the time-to-collision (TTC) is determined based on the relative scale (S) and the time interval (Δt) between frames 15.

Figure 2B:
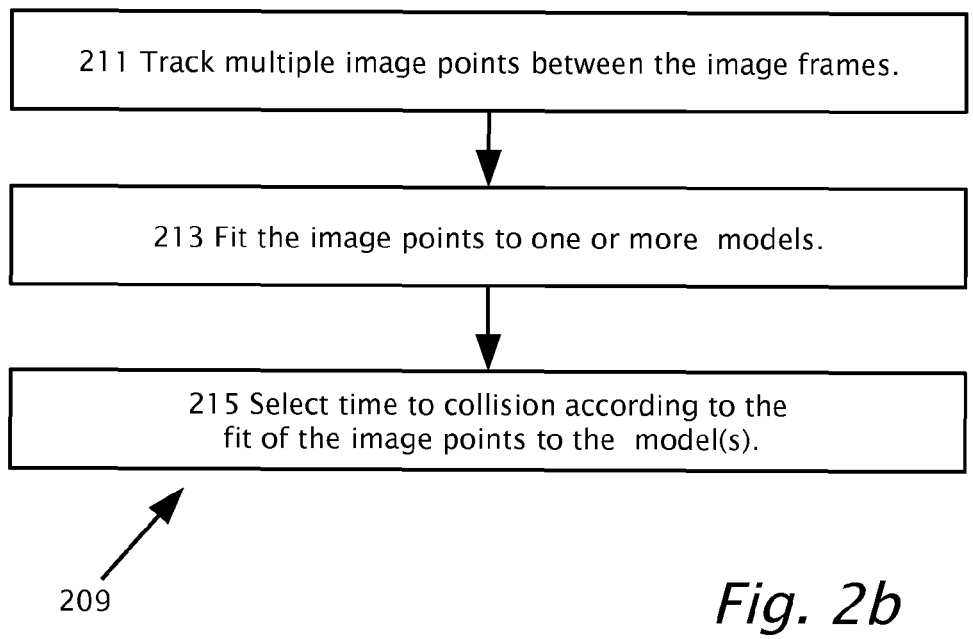
FIG. 2b shows further details of determining time to collision step shown in FIG. 2a, according to a feature of the present invention.

Reference is now made to FIG. 2b which shows further details of determining time to collision step 209 shown in FIG. 2a, according to a feature of the present invention. In step 211 multiple image points in a patch 32 may be tracked between image frames 15. In step 213 the image points of may be fit to one or more models. A first model may be a vertical surface model which may include objects such as a pedestrian, a vehicle, a wall, bushes, trees or a lamp post. A second model may be a road surface model which considers features of image points on the road surface. A mixed model may include one or more image points from the road and one or more image points from an upright object For models which assume at least a portion of the image points of an upright object multiple time-to-collision (TTC) values may be computed. In step 215, the best fit of the image points to a road surface model, a vertical surface model, or a mixed model enables selection of the time-to-collision (TTC) value. A warning may be issued based on the time-to-collision (TTC) being less than a threshold and when the best fit model is the vertical surface model or a mixed model.

Alternatively, step 213 may also include in the image frames 15, the detection of a candidate image. The candidate image may be a pedestrian or a vertical line of a vertical object such as lamppost for example. In either case of a pedestrian or a vertical line, patch 32 may be selected so as to include the candidate image. Once patch 32 has been selected it may then be possible to perform a verification that the candidate image is an image of an upright pedestrian and/or a vertical line. The verification may confirm that the candidate image is not an object in the road surface when the best fit model is the vertical surface model.

Referring back to FIGS. 1a and 1b, sub-pixel alignment of patch 32 from the first image shown in FIG. 1a to the second image shown in FIG. 1b may produce a size increase or increase in relative scale S by 8% (S=1.08) (step 207). Given the time difference between the images of Δt=0.5 sec, the time to contact (TTC) can be computed (step 209) using equation 1 below:

$$TTC = \frac{\Delta t}{S-1} = 0.5008 = 6.25 \text{ sec} \qquad (1)$$

If vehicle 18 speed v in known (v=4.8 m/s), the distance Z to the target can also be computed using equation 2 below:

$$Z = \frac{v * \Delta t}{S-1} = \frac{4.8 * 0.5}{1.08 - 1} = 30 \text{ m} \qquad (2)$$

Figure 3B:
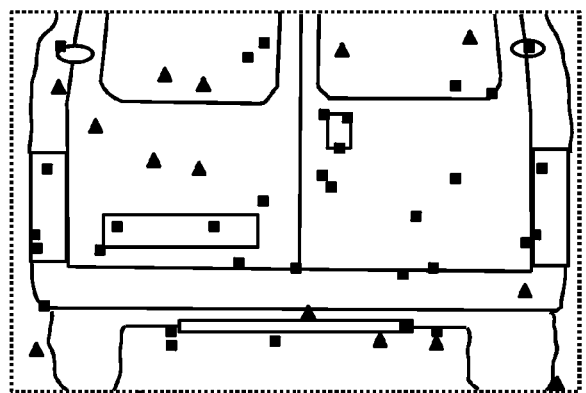
FIG. 3b shows the vertical motion of points δy as a function of vertical image position (y) for FIG. 3a, according to an feature of the present invention.
Figure 3B:
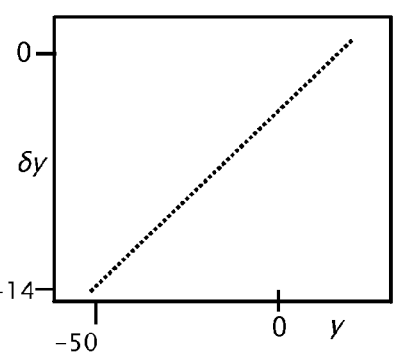
Figure 3C:
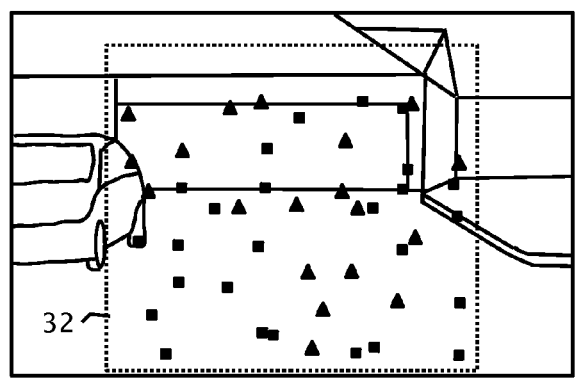
FIG. 3c shows a rectangular region which is primarily of a road surface, according to a feature of the present invention.
Figure 3D:
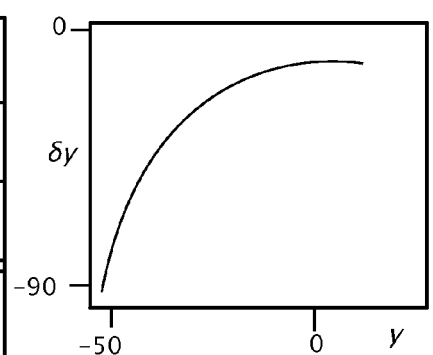
FIG. 3d shows the vertical motion of points δy as a function of vertical image position (y) for FIG. 3c, according to an feature of the present invention.

FIGS. 3b and 3d show the vertical motion of points δy as a function of vertical image position (y), according to an feature of the present invention. Vertical motion δy is zero at the horizon and negative values are below the horizon. Vertical motion of points δy is shown in equation 3 below.

$$\delta y = \frac{\Delta Z(y - y_0)}{Z} \qquad (3)$$

Equation (3) is a linear model relating y and δy and has effectively two variables. Two points may be used to solve for the two variables.

For vertical surfaces the motion is zero at the horizon ($y_0$) and changes linearly with image position since all the points are at equal distance as in the graph shown in FIG. 3b. For road surfaces, points lower in the image are closer (Z is smaller) as shown in equation 4 below:

$$Z = \frac{fH}{y - y_0} \qquad (4)$$

and so the image motion (δy) increases at more than linear rate as shown in equation 5 below and in the graph of FIG. 3d.

$$\delta y = \frac{\Delta Z(y - y0)^2}{fH} \qquad (5)$$

Equation (5) is a restricted second order equation with effectively two variables.

Again, two points may be used to solve for the two variables.

Reference is now made to FIGS. 3a and 3c which represent different image frames 15. In FIGS. 3a and 3c two rectangular regions are shown by dotted lines. FIG. 3a shows an upright surface (the back of a van). The square points are points that were tracked (step 211) and the motion matches (step 213) the motion model for an upright surface shown in the graph of image motion (δy) versus point height y in FIG. 3b. The motion of the triangular points in FIG. 3a do not match the motion model for an upright surface. Reference is now made to FIG. 3c which shows a rectangular region primarily of a road surface. The square points are points that match a road surface model shown in the graph of image motion (δy) versus point height y in FIG. 3d. The motion of triangular points do not match the motion model for the road surface and are outliers. The task in general therefore is to determine which points belong to the model (and to which model) and which points are outliers which may be performed by a robust fit approach as explained below.

Figure 4A:
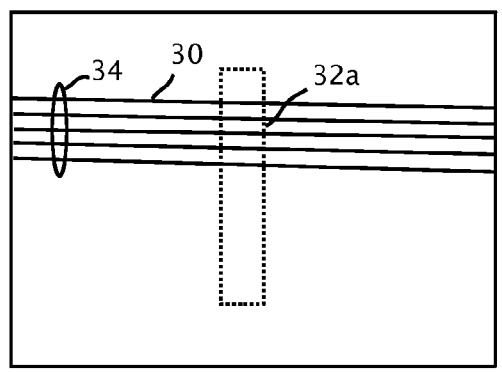
FIG. 4a shows an image frame which includes an image of a metal fence with horizontal lines and a rectangular patch, according to a feature of the present invention.
Figure 4B:
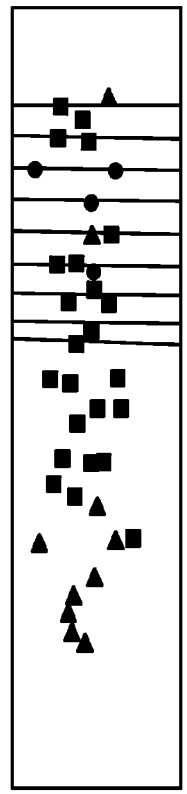
FIGS. 4b and 4c show more details of the rectangular patch shown in FIG. 4a, according to a feature of the present invention.
Figure 4C:
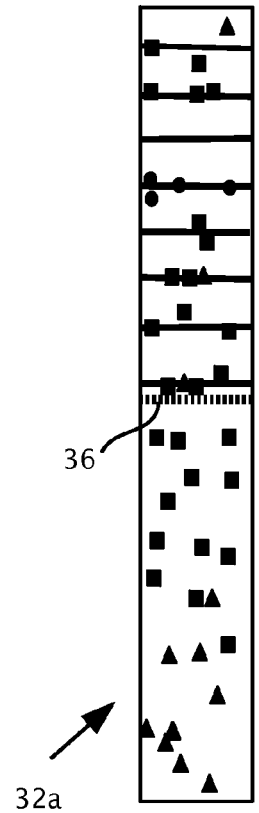
Figure 4D:
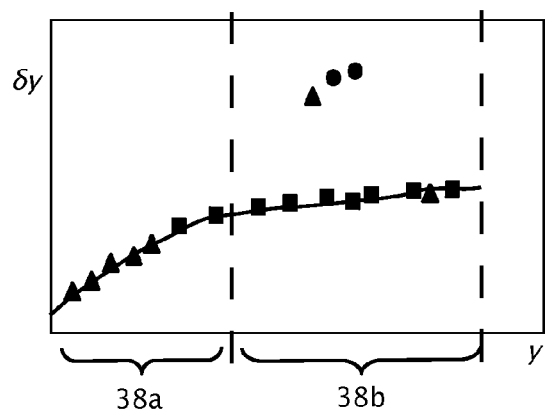
FIG. 4d illustrates a graph of vertical motion of points (δy) versus vertical point position (y), according to a feature of the present invention.

Reference is now made to FIGS. 4a, 4b, 4c and 4d which show a typical scenario of a mixture of two motion models found in an image, according to an feature of the present invention. FIG. 4a shows an image frame 15 including an image of a metal fence 30 with horizontal lines 34 and rectangular patch 32a. Further detail of patch 32a are shown in FIGS. 4b and 4c. FIG. 4b shows detail of patch 32a of a previous image frame 15 and FIG. 4c shows detail 32a in a subsequent image frame 15 when vehicle 18 is closer to fence 30. Image points are shown as squares, triangles and circles in FIGS. 4c and 4d on the upright obstacle 30 and image points are shown on the road surface leading up to the obstacle 30. Tracking points inside the rectangular region 32a show that some points in the lower part of region 32a correspond to a road model and some points in the upper part of region 32a correspond to an upright surface model. FIG. 4d illustrates a graph of vertical motion of points (δy) versus vertical point position (y). The recovered model shown graphically in FIG. 4d has two parts a curved (parabolic) section 38a and a linear section 38b. The transition point between sections 38a and 38b corresponds to the bottom of upright surface 30. The transition point is also marked by a horizontal dotted line 36 shown in FIG. 4c. There are some points shown by triangles in the FIGS. 4b and 4c that were tracked but did not match the model, some tracked points which did match the model are shown by squares and some points that did not track well are shown as circles.

Figure 5:
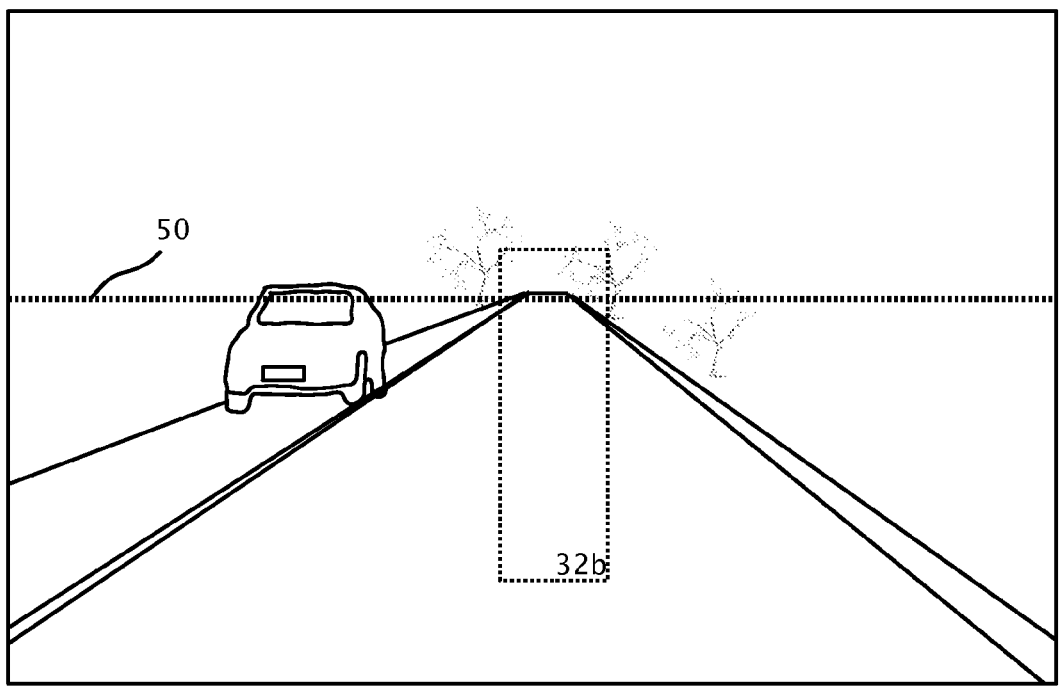
FIG. 5 illustrates another example of looming in an image frame, according to a feature of the present invention.

Reference is now made to FIG. 5 which illustrates another example of looming in an image frame 15. In image frame 15 of FIG. 5, there is no upright surface in patch 32b, only clear road ahead and the transition point between the two models is at the horizon marked by dotted line 50.

Estimation of the Motion Model and Time to Collision (TTC)

The estimation of the motion model and time to contact (TTC) (step 215) assumes we are provided a region 32, e.g. a rectangular region in image frame 15. Examples of rectangular regions are rectangles 32a and 32b shown in FIGS. 3 and 5 for example. These rectangles may be selected based on detected objects such as pedestrians or based on the host vehicle 18 motion.

1. Tracking Points (Step 211):

(a) A rectangular region 32 may be tessellated into 5×20 grid of sub-rectangles.

(b) For each sub-rectangle, an algorithm may be performed to find a corner of an image, for instance by using the method of Harris and Stephens and this point may be tracked. Using the best 5×5 Harris Point the eigenvalues of the matrix below may be considered, $$\begin{pmatrix} \sum \delta x^2 & \sum \delta x \delta y \\ \sum \delta x \delta y & \sum \delta y^2 \end{pmatrix} \qquad (6)$$

and we look for two strong eigenvalues.

(c) Tracking may be performed by exhaustive search for the best some of squared differences (SSD) match in a rectangular search region of width W and height H. The exhaustive search at the start is important since it means that a prior motion is not introduced and the measurements from all the sub-rectangles are more statistically independent. The search is followed by fine tuning using an optical flow estimation using for instance the method Lukas Kanade. The Lukas Kanade method allows for sub-pixel motion.

2. Robust Model Fitting (Step 213):

(a) Pick two or three points randomly from the 100 tracked points.

(b) The number of pairs ($N_{pairs}$) picked depends the vehicle speed (v) and is given for instance by:

$$N_{pairs} = \min(40, \max(5, 50-v)) \qquad (7)$$

where v is in meter/second. The number of triplets ($N_{triplets}$) is given by:

$$N_{triplets} = 50 - N_{pairs} \quad (8)$$

(c) For two points, two models may be fit (step 213). One model assumes the points are on an upright object. The second model assumes they are both on the road.

(d) For three points two models may also be fit. One model assumes the top two points are on an upright object and the third (lowest) point is on the road. The second model assumes the upper point is on an upright object and the lower two are on the road.

Two models may be solved for three points by using two points to solve for the first model (equation 3) and then using the resulting $y_0$ and the third point to solve for the second model (equation 5).

(e) Each model in (d) gives a time-to-collision TTC value (step 215). Each model also gets a score based on how well the 98 other points fit the model. The score is given by the Sum of the Clipped Square of the Distance (SCSD) between the y motion of the point and predicted model motion. The SCSD value is converted into a probability like function:

where is the number of points (N=98).

$$\text{score} = \exp \frac{-SCSD}{N} \quad (9)$$

(f) Based on the TTC value, vehicle 18 speed and assuming the points are on stationary objects, the distance to the points: $Z = v \times TTC$ may be computed. From the x image coordinate of each image point distance, the lateral position in world coordinates may be computed:

$$X = \frac{xZ}{f} \quad (10)$$

$$\Delta X = \frac{\delta x Z}{f} \quad (11)$$

(g) The lateral position at time TTC is computed thus. A binary Lateral Score requires that at least one of the points from the pair or triplet must be in the vehicle 18 path.

3. Multiframe Scores: At each frame 15 new models may be generated, each with its associated TTC and score. The 200 best (highest scoring) models may be kept from the past 4 frames 15 where the scores are weighted:

where n=0.3 is the age of the score and α=0:95.

$$\text{score}(n) = \alpha^n \text{score} \quad (12)$$

4. FCW Decision: the actual FCW warning is given if any of the following three conditions occurs:

(a) The TTC for the model with the highest score is below the TTC threshold and the score is greater than 0.75 and $$\frac{\sum_{TTC<Threshold} \text{scores}}{\sum_{allmodels} \text{scores}} > 0.3 \quad (13)$$

(b) The TTC for the model with the highest score is below the TTC threshold and $$\frac{\sum_{TTC<Threshold} \text{scores}}{\sum_{allmodels} \text{scores}} > 0.5 \quad (14)$$

(c)

$$\frac{\sum_{TTC<Threshold} \text{scores}}{\sum_{allmodels} \text{scores}} > 0.75 \quad (15)$$

FIGS. 3 and 4 have shown how to robustly provide a FCW warning for points inside a given rectangle 32. How the rectangle is defined depends on the application as shown by other exemplary features of FIGS. 7a-7d and 8a, 8b.

FCW Trap for General Stationary Objects

Figure 6:
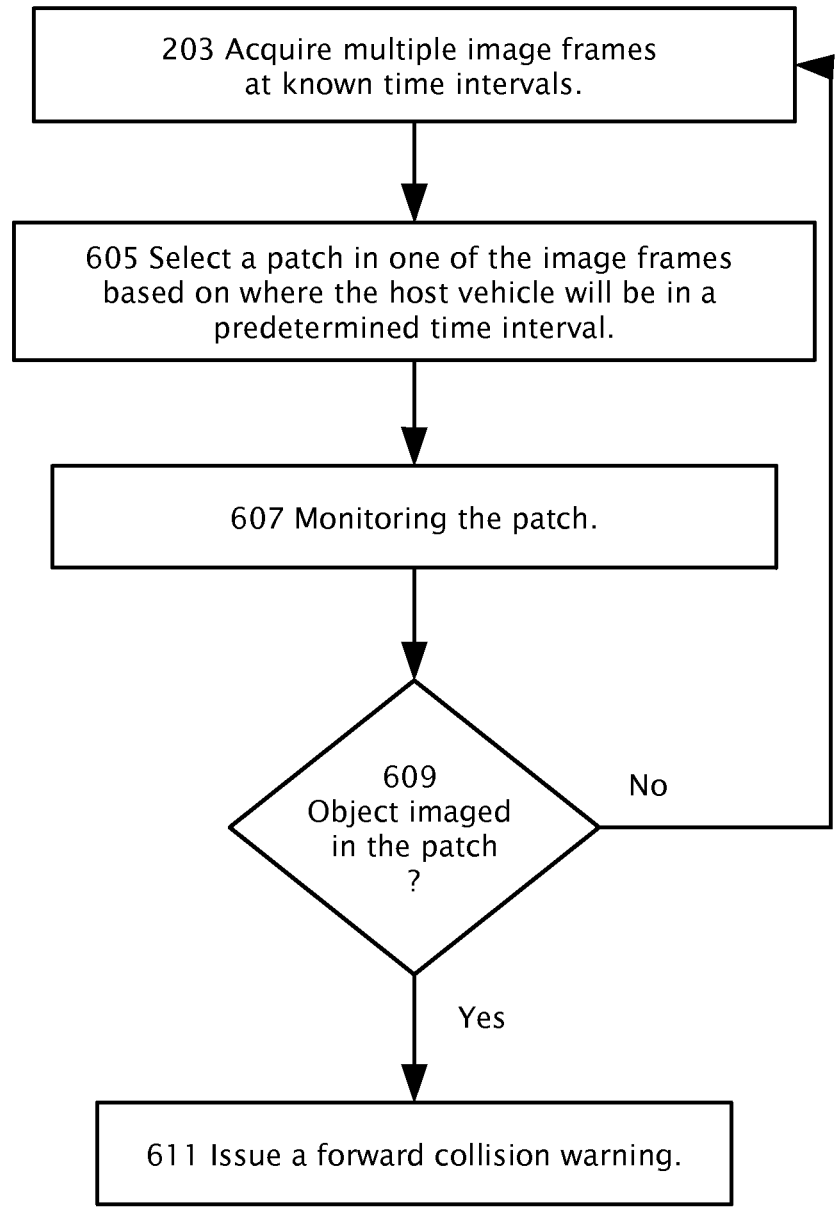
FIG. 6 shows a method for providing a forward collision warning trap, according to a feature of the present invention.

Reference is now made to FIG. 6 which shows a method 601 for providing a forward collision warning trap (FCWT) 601, according to a feature of the present invention. In step 203 multiple image frames 15 are acquired by camera 12. In step 605, patch 32 is selected in an image frame 15 which corresponds to where motor vehicle 18 will be in a predetermined time interval. Patch 32 is then monitored in step 607. In decision step 609 if a general object is imaged and detected in patch 32, a forward collision warning is issued in step 611. Otherwise capturing of images frames continues with step 203.

Figure 7A:
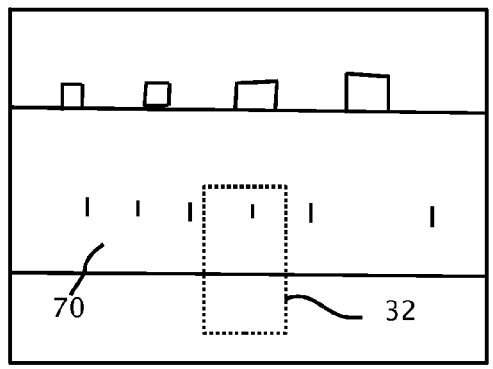
FIGS. 7a and 7b show examples of a forward collision trap warning being triggered on walls, according to an exemplary feature of the present invention.
Figure 7B:
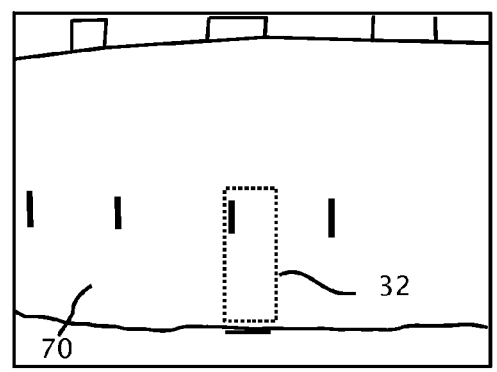
Figure 7C:
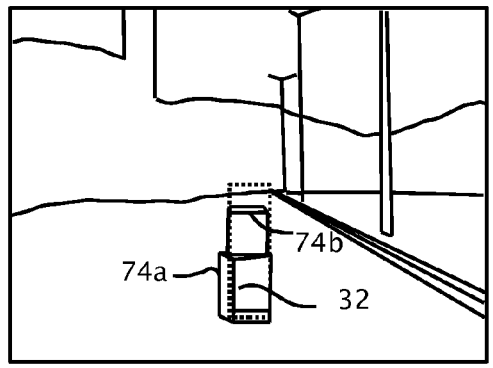
FIG. 7c shows an example of a forward collision trap warning being triggered on boxes, according to an exemplary feature of the present invention.
Figure 7D:
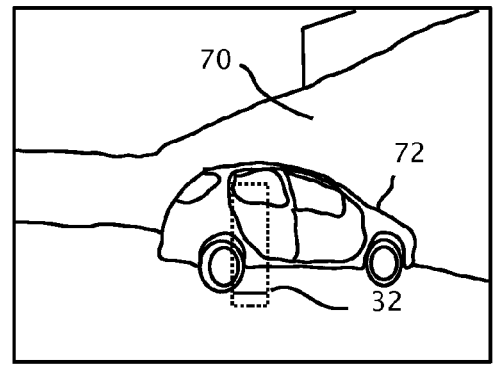
FIG. 7d shows an example of a forward collision trap warning being triggered on sides of a car, according to an exemplary feature of the present invention.

FIGS. 7a and 7b show examples of the FCWT 601 warning being triggered on walls 70, in FIG. 7d sides of a car 72 and in FIG. 7c on boxes 74a and 74b, according to an exemplary feature of the present invention. FIGS. 7a-7d are examples of general stationary objects which require no prior class based detection. The dotted rectangular region is defined as a target W=1 m wide at a distance where the host vehicle will be in t=4 seconds.

Where v is the vehicle 18 speed, H is the height of camera 12 and w and y are a $$Z = vt \quad (16)$$

$$w = \frac{fW}{Z} \quad (17)$$

$$y = \frac{fH}{Z} \quad (18)$$

rectangle width and vertical position in the image respectively. The rectangular region is an example of an FCW trap. If an object "falls" into this rectangular region, the FCW Trap may generate a warning if the TTC is less than a Threshold.

Improving Performance Using Multiple Traps:

In order to increase the detection rate, the FCW trap may be replicated into 5 regions with 50% overlap creating a total trap zone of 3 m width.

Dynamic position of the FCW trap may be selected (step 605) on yaw rate: the trap region 32 may be shifted laterally based on the vehicle 18 path determined from a yaw rate sensor, the vehicle 18 speed and dynamical model of the host vehicle 18.

The FCW trap 601 concept can be extended to objects consisting mainly of vertical (or horizontal lines). A possible problem with using the point based techniques on such objects is that the good Harris (corner) points are most often created by the vertical lines on the edge of the object intersecting horizontal lines on the distant background. The vertical motion of these points will be like the road surface in the distance.

Figure 8A:
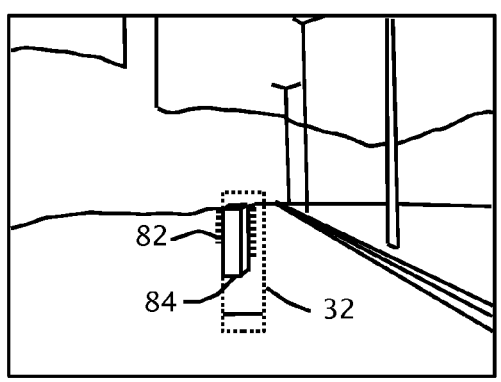
FIG. 8a shows an example of objects with strong vertical lines on a box, according to an aspect of the present invention.
Figure 8B:
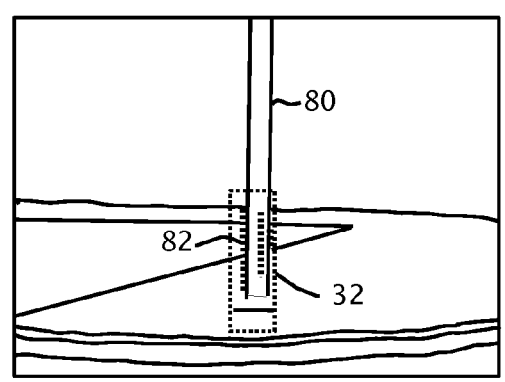
FIG. 8b shows an example of objects with strong vertical lines on a lamp post, according to an aspect of the present invention.

FIGS. 8a and 8b show examples of objects with strong vertical lines 82 on a lamp post 80 in FIG. 8b and on a box 84 in FIG. 8a. Vertical lines 82 are detected in the trap zone 32. The detected lines 82 may be tracked between images. Robust estimation may be performed by pairing up lines 82 from frame to frame and computing a TTC model for each line pair, assuming a vertical object, and then giving a score based on the SCSD of the other lines 82. Since the number of lines may be small, often all combinatorially possibly line pairs are tested. Only line pairs where there is significant overlap are used. In the case of horizontal lines, triplets of lines are also giving two models as with points.

FCW Trap for Validating Collision Warning Signals with Pedestrians

Special classes of objects such as vehicles and pedestrians can be detected in image 15 using pattern recognition techniques. According to the teachings of U.S. Pat. No. 7,113,867, these objects are then tracked over time and an FCW 22 signal can be generated using the change in scale. However, before giving a warning it is important to validate the FCW 22 signal using an independent technique. Validating the FCW 22 signal using an independent technique, for instance using method 209 (FIG. 2b) may be particularly important if system 16 will activate the brakes. In Radar/vision fusion systems the independent validation can come from the radar. In a vision only based system 16, the independent validation comes from an independent vision algorithm.

Object (e.g. pedestrian, lead vehicle) detection is not the issue. Very high detection rate can be achieved with a very low false rate. A feature of the present invention is to generate a reliable FCW signal without too many false alarms that will irritate the driver, or worse, cause the driver to brake unnecessarily. A possible problem with conventional pedestrian FCW systems is to avoid false forward collision warnings as the number of pedestrians in the scene is large but the number of true forward collision situations is very small. Even a 5% false rate would mean the driver would get frequent false alarms and probably never experience a true warning.

Pedestrian targets are particularly challenging for FCW systems because the targets are non-rigid making tracking (according to the teachings of U.S. Pat. No. 7,113,867) difficult and scale change in particular is very noisy. Thus the robust model (method 209) may be used to validate the forward collision warning on pedestrians. The rectangular zone 32 may be determined by a pedestrian detection system 20. A FCW signal may be generated only if target tracking performed by FCW 22, according to U.S. Pat. No. 7,113,867 and the robust FCW (method 209) give a ITC smaller than one or more threshold values which may or may not be previously determined. Forward collision warning FCW 22, may have a different threshold value from the threshold used in the robust model (method 209).

One of the factors that can add to the number of false warning is that pedestrians typically appear in less structured roads where the drivers driving pattern can be quite erratic including sharp turns and lane changes. Thus some further constraints may need to be included on issuing a warning:

When a curb or lane mark is detected the FCW signal is inhibited if the pedestrian is on the far side of the curb or lane and neither of the following conditions occur:

1. The pedestrian is crossing the lane mark or curb (or approaching very fast). For this it may be important to detect the pedestrian's feet.

2. The host vehicle 18 is not crossing the lane mark or curb (as detected by an LDW 21 system for example).

The drivers intentions are difficult to predict. If the driver is driving straight, has not activated turn signals and there are no lane markings predicting otherwise it is reasonable to assume that the driver will continue straight ahead. Thus, if there is a pedestrian in path and TTC is below threshold an FCW signal can be given. However if the driver is in a turn it is equally likely that he/she will continue in the turn or break out of the turn and straighten out. Thus, when yaw rate is detected, an FCW signal may only be given if the pedestrian is in path assuming the vehicle 18 will continue at the same yaw and also the pedestrian is in path if the vehicle straightens out.

According to a feature of the present invention, likely paths of vehicle 18 are predicted. The likely paths may include proceeding straight ahead, continue on a curve, following a lane marking or curb, avoiding going up on a curb and/or following a preceding vehicle.

In order to avoid false positive collision warnings with pedestrians, FCW signal may be inhibited if there is a likely path for the motor vehicle which does not include a pedestrian with the TTC to the pedestrian less than the threshold.

Pedestrian Lateral Motion

The pedestrian typically moves slowly compared to the host vehicle 18 and therefore the longitudinal motion of the pedestrian can be ignored. The lateral motion of the pedestrian, whether into the host vehicle 18 path or away from the host vehicle 18 path is critical.

As the longitudinal distance to the pedestrian decreases there will be outward image motion (optical flow):

$$\delta x_{of} = \frac{v \Delta T (x - x_0)}{Z}$$

where v is vehicle 18 speed, $v \Delta T = \Delta Z$, is the vehicle 18 longitudinal motion and $x_0$ is the x coordinate of the focus of expansion (FOE):

$$x_0 \approx \frac{w_y \Delta T}{2}$$

where $w_y$ is the yaw rate. This is a simplified motion model that assumes no lateral slippage of the host vehicle 18.

So the lateral motion from a tracked point on the pedestrian can be computed from the lateral image motion δx:

$$\Delta X = \frac{(\delta x_{of} - x_0) Z}{f \Delta T}$$

The current lateral position of the pedestrian ($X_{T=0}$) or simply X is given by:

$$X_{T=0} = \frac{xZ}{f}$$

The lateral position of the pedestrian at T=TTC is given by:

$$X_{T=TTC} = X + \Delta X \ast TTC$$

Estimating Collision Path with a Pedestrian

Figure 6A:
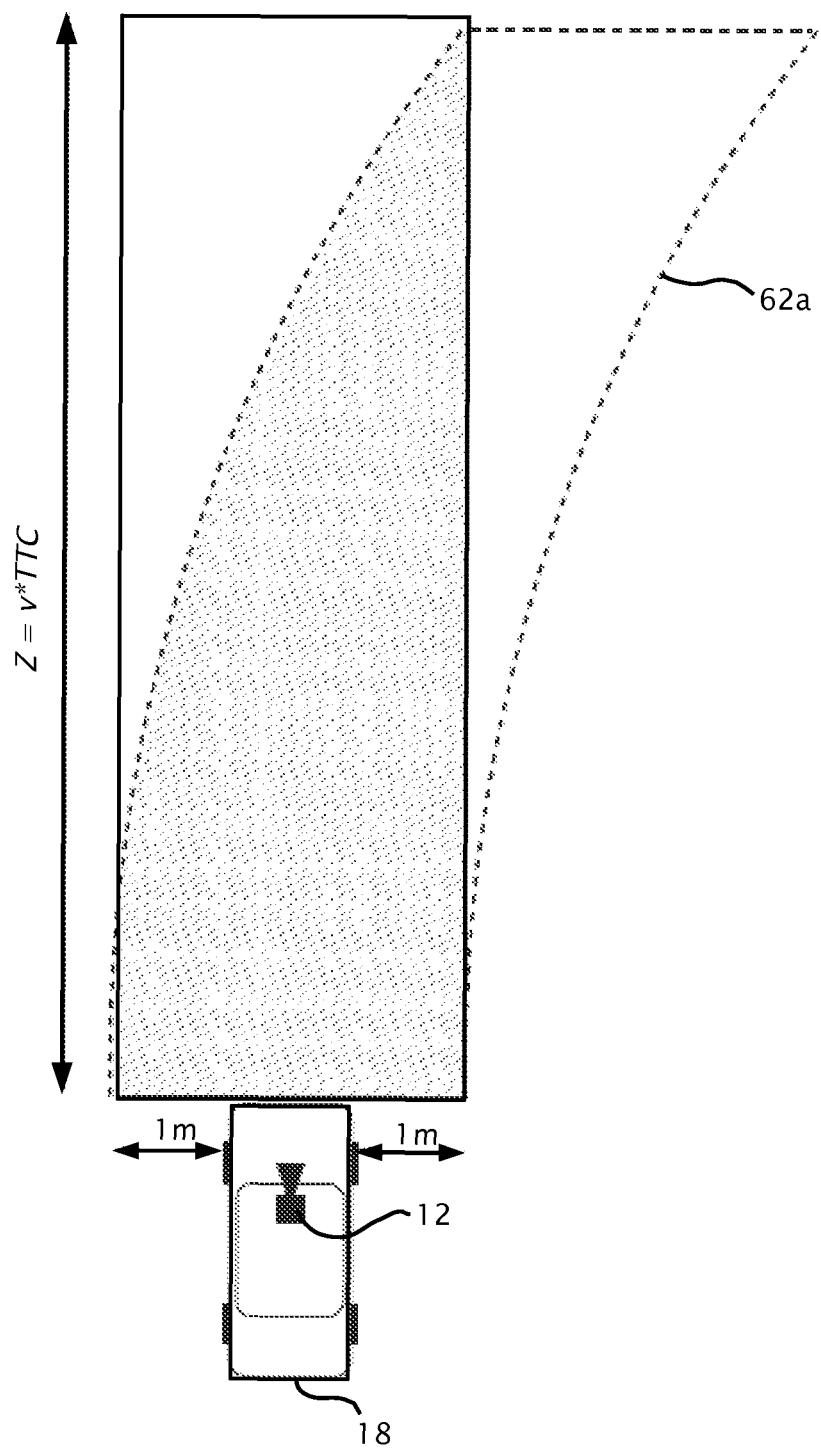
FIGS. 6a and 6b show examples of two warning zones respectively according to an exemplary feature of the present invention.
Figure 6B:
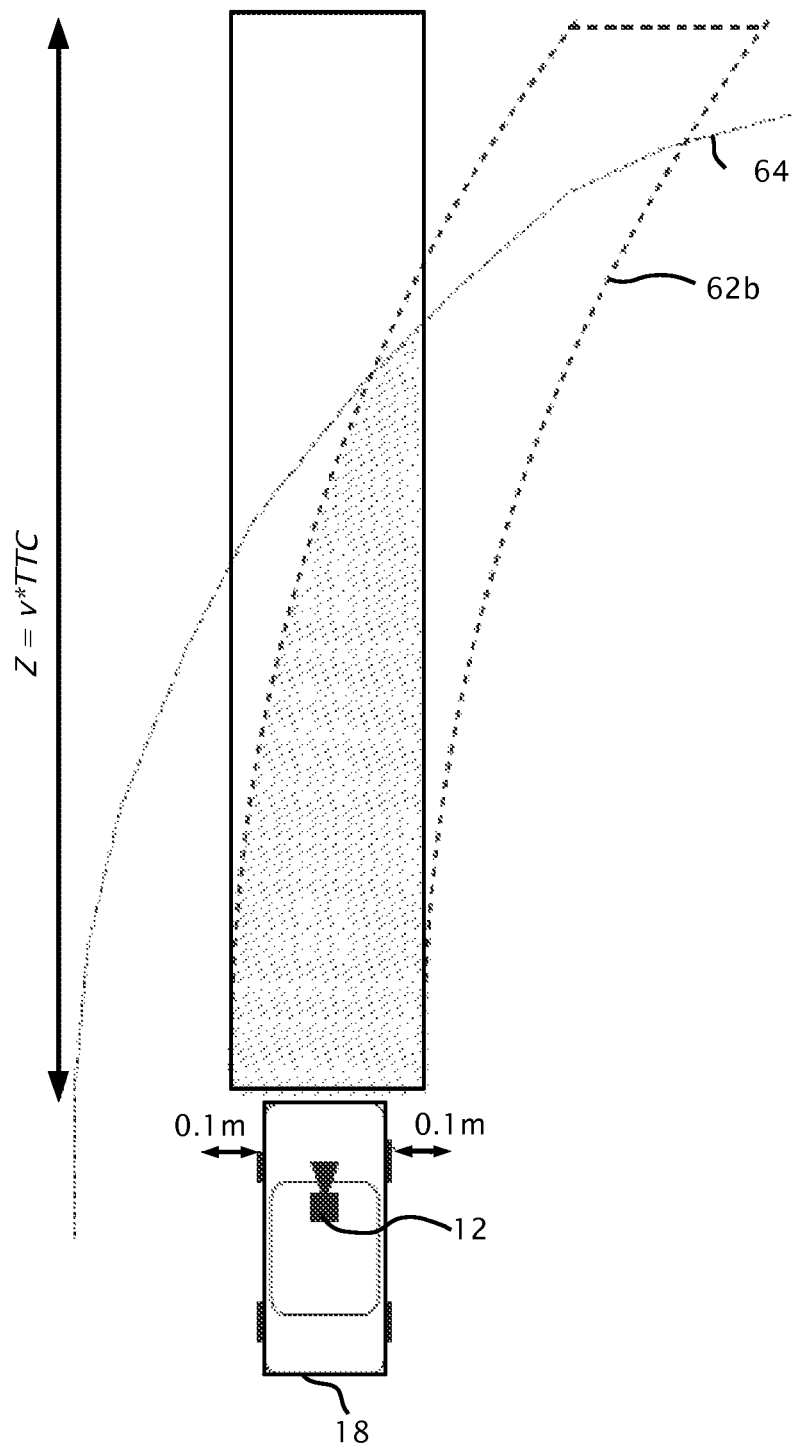

To determine whether the host vehicle 18 is on a collision course with the pedestrian and a warning should be issued, two warning zones may be defined in world coordinate space. Warning zone 1 is shown in FIG. 6a and warning zone 2 is shown in FIG. 6b:
1. Warning zone 1: The intersection of a rectangular region spanning 1 m to the left and right of vehicle 18 and of length v*TTC with a curved region 62a spanning 1 m to the left and right of the vehicle assuming vehicle 18 continues on a path predicted by the yaw rate.
2. Warning zone 2: The intersection of a rectangular region spanning 0.1 m to the left and right of vehicle 18 and of length v*TTC with a curved region 62b spanning 0.1 m to the left and right of vehicle 18 assuming vehicle 18 continues on a path predicted by the yaw rate. Region 62b is further intersected with the region to the right of the left lane mark 64 or curb if detected and with the region to the left of the right lane mark or curb if detected.

Triggering a Pedestrian FCW Warning

A pedestrian FCW warning may be given if the following hold:
1. A pedestrian has been detected with high confidence.
2. $TTC_1$, based on distance and vehicle speed is below a threshold $T_1$:

$$TTC_1 = \frac{Z}{v} < T_1$$

3. $TTC_2$, based on FCW validation (method 201 for example) is below threshold $T_2$ and the FCW decision is 'true'.
4. The two predicted TTC's are not very different:
5. The current pedestrian position (X, Z) at T=0 is inside warning zone 1.

$|TTC_1 - TTC_1| < T_3$

6. The predicted pedestrian position ($X_{T=TTC}$, $Z_{T=TTC}$) is inside warning zone 2.

Figure 6C:
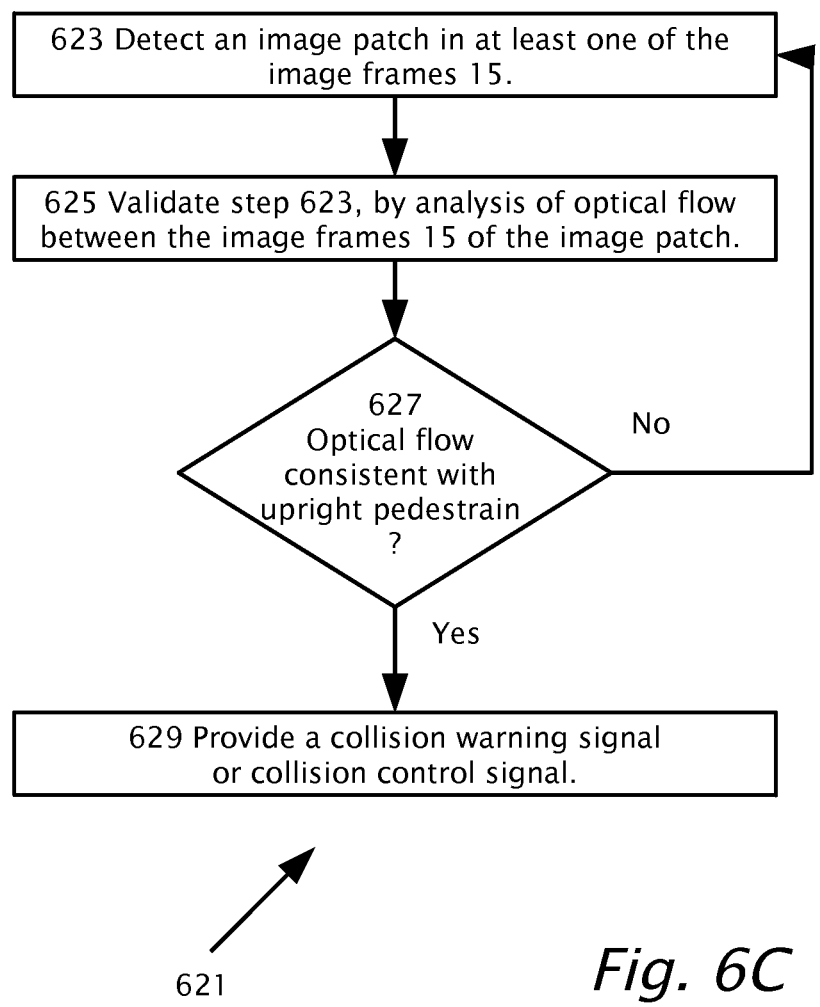
FIG. 6c shows a method, according to a feature of the present invention.

Reference is now made to FIG. 6c which shows a method 621, according to a feature of the present invention. Method 621 is a method for preventing a collision between a motor vehicle 18 and a pedestrian. In step 623, an image patch 32 as a candidate image is detected from at least one image frames 15 captured in the field of view of camera 12. The candidate image may include an image of a pedestrian. Step 621 is validated in step 625 by an analysis of an optical flow between the image frames 15 for image patch 32. In decision 627, if the optical flow between the image frames 15 for image patch 32 is consistent with an upright pedestrian, a collision warning signal or collision control signal is provided in step 629. The optical flow as discussed above may be by virtue of the lateral motion of the pedestrian in the field of view of camera 12. If the optical flow between the image frames 15 for image patch 32 is not consistent with an upright pedestrian then a candidate image is detected from at least one image frames 15 captured in the field of view of camera 12 in step 623.

Figure 6D:
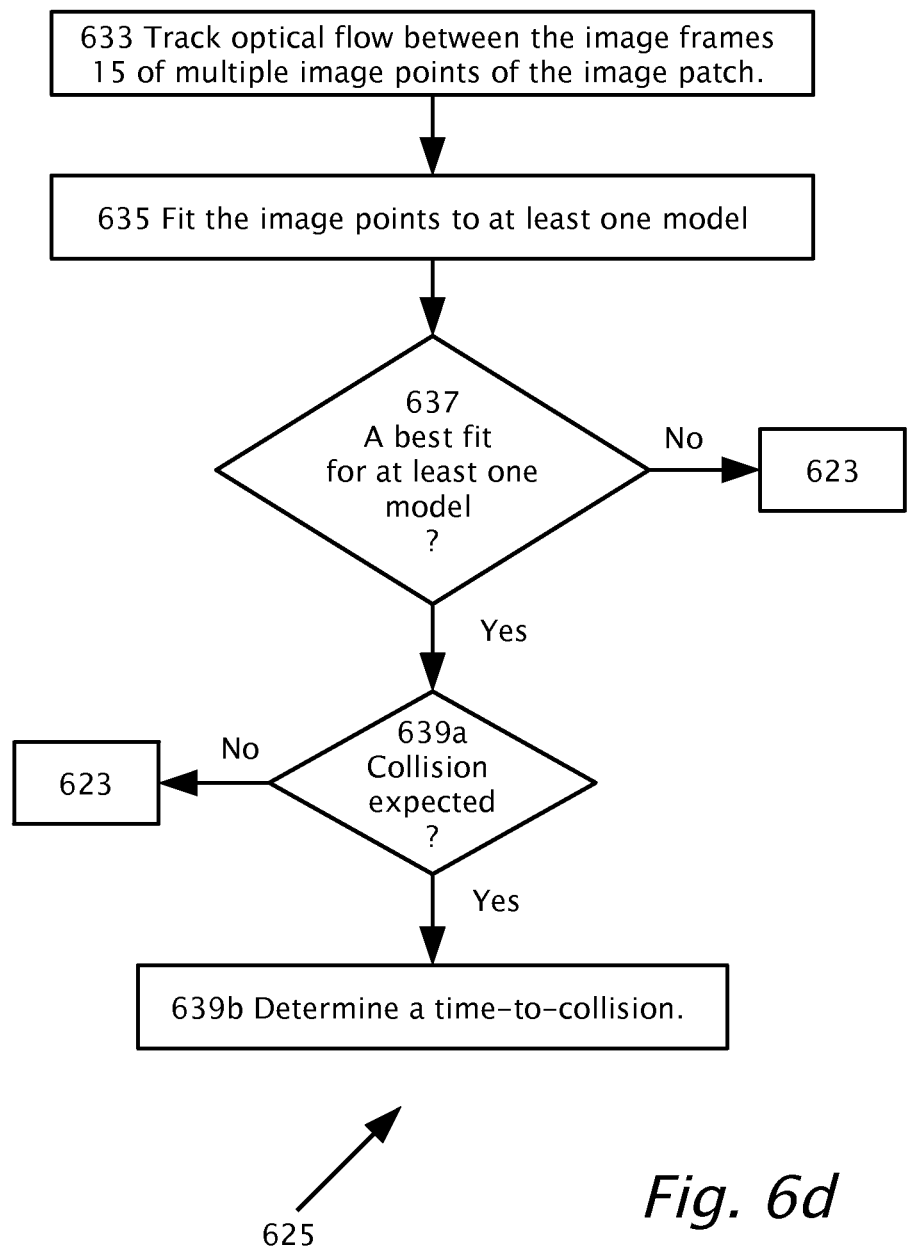
FIG. 6d shows further details of the validation step shown in FIG. 6c, according to a feature of the present invention.

Reference is now made to FIG. 6d which shows further details of validation step 625 shown in FIG. 6c, according to another feature of the present invention. In step 633, the optical flow is tracked between image frames 15 for multiple image points of image patch 32. The multiple image points of image patch 32 are then fitted to a model in step 635. If a sufficient fit is not found in decision 637, then a collision warning or collision control signal may be inhibited. A candidate image may be detected again from image frames 15.

If a best fit is found in decision box 637, then in decision box 639a if a collision is expected, that is the best fit corresponds to an upright pedestrian or another vertical object, then a time-to-collision may be determined (step 639b). If a collision is not expected, for instance because the object is not upright, then a candidate image may be detected again in step 623.

Figure 6E:
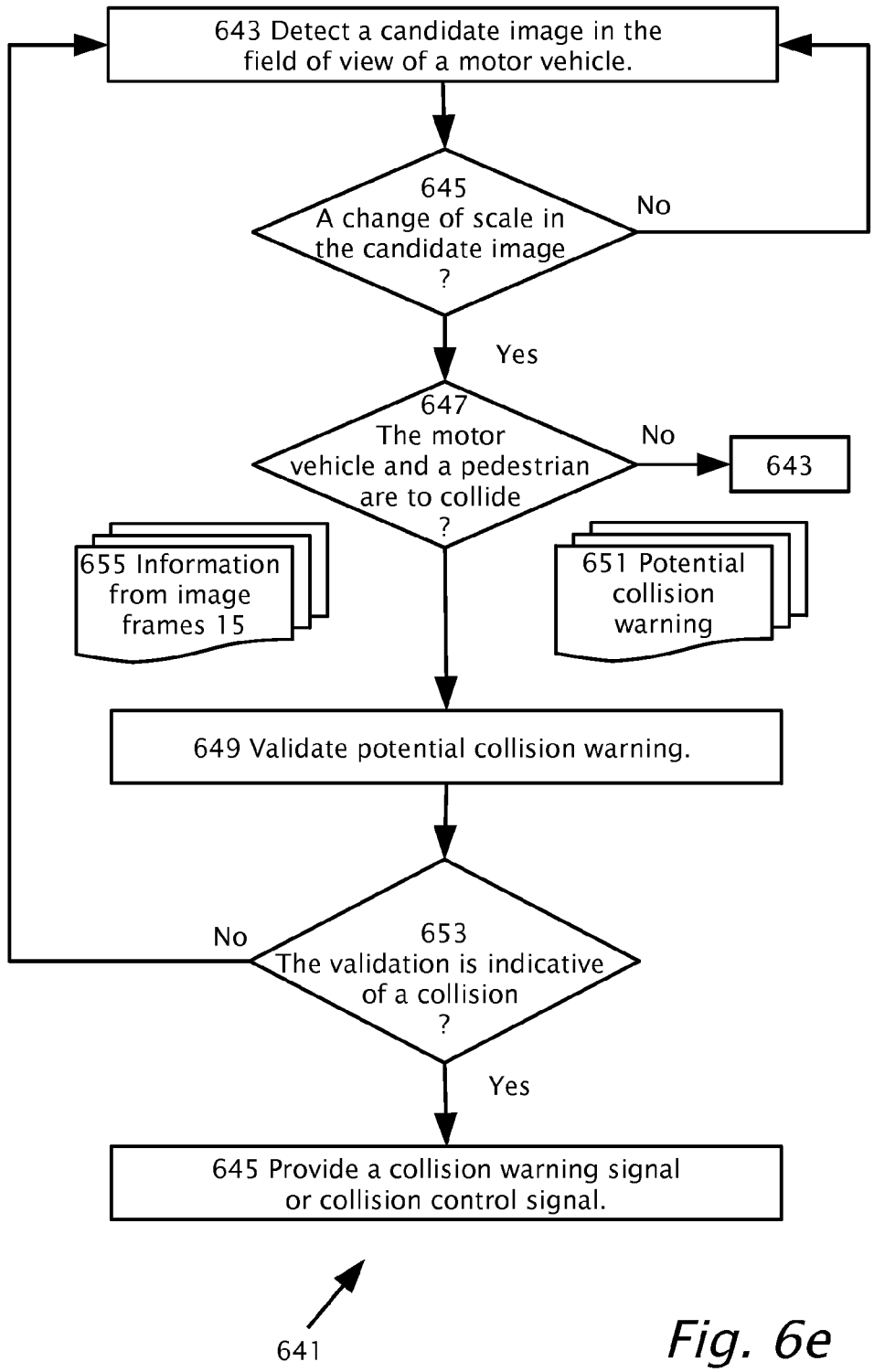
FIG. 6e shows a method, according to a feature of the present invention.

Reference is now made to FIG. 6e which shows a method 641, according to a feature of the present invention. Method 641 is a method for prevention of a collision between a motor vehicle and a pedestrian. In step 643 a candidate image is detected in the field of view of camera 12 mounted in motor vehicle 18. The candidate image may include an image of a pedestrian. In decision block 645 it is determined if a change of scale is detected in the candidate image. If a sufficient change of scale is not detected in the candidate image, e.g. time-to-collision is greater than threshold, then detection of a candidate image may continue in step 643. If a sufficient change of scale is detected in the candidate image, and if in decision block 647 the vehicle and a pedestrian are expected to collide for instance based on TTC, then the potential collision warning is validated in step 649 according to any of the methods disclosed herein. Otherwise, detection of a candidate image may continue in step 643. Decision step 647 may include calculating a first time-to-collision based on the change of scale. If the motor vehicle 18 and a pedestrian are expected to collide then further information 655 from image frames 15 is used for validation in step 649. Potential collision warning 651 may be validated or inhibited in decision block 653. If validated then a collision warning signal or a collision control signal is provided in step 645, otherwise detection of a candidate image continues in step 643.

A second time-to-collision may be calculated based on information 655 from image frames 15, by a comparison made between the first and second times to collision. The collision warning signal or the collision control signal provided in step 645 may be performed when the absolute value difference between the first and second time-to-collision is less than a 10 threshold.

Figure 6F:
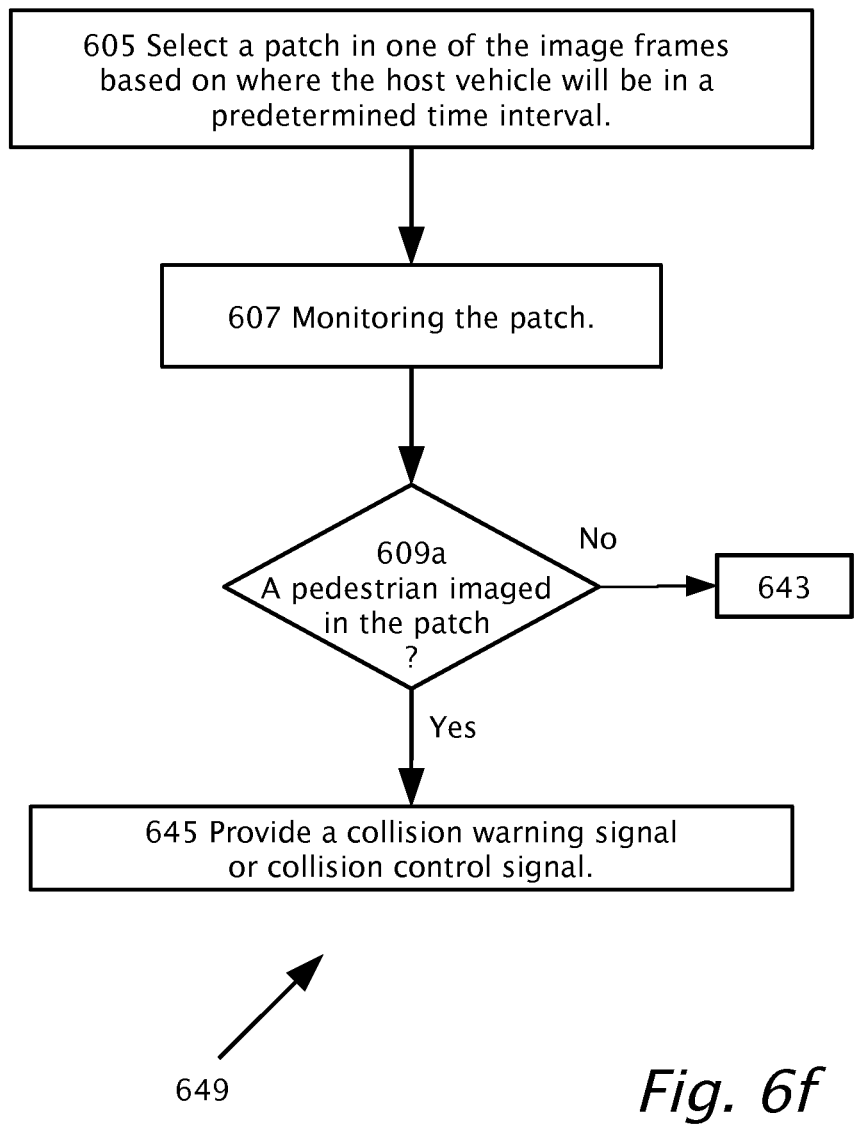
FIG. 6f shows further details of the validation step shown in FIG. 6e, according to a feature of the present invention.

Reference is now made to FIG. 6f which shows further details of validation step 649 shown in FIG. 6e, according to a feature of the present invention. In step 605, a patch 32 is selected in one of the image frames 15. The selection of patch 32 is based on where motor vehicle 18 will be in a predetermined time interval followed by patch being monitored in step 607. Steps 605 and 607 are described in greater detail above in the description of method 601. In decision 609a, if a pedestrian is imaged in patch 32, then a collision warning signal or a collision control signal is provided in step 645, otherwise detection of a candidate image continues in step 643.

Validation step 649 may include an analysis of an optical flow of the candidate image. In the case of a pedestrian the optical flow may be the lateral motion of the pedestrian. Validation step 649 may also include a determination that lane markings predict a straight road. The straight road may be indicative that a pedestrian may be more likely to cross the road as opposed to the curved road giving the impression that a pedestrian is already in road. Further validation 649 may also include a determination that a pedestrian is crossing a lane mark or curb. Avoidance of the provision of a collision warning signal or collision control signal (step 645)

may take into consideration that motor vehicle 18 is changing lanes and therefore the pedestrian will not be in the path of motor vehicle 18.

Alternatively, a collision warning and/or collision control may be provided (or not inhibited) without necessarily determining a change in scale in the candidate image (step 645). A candidate image of a pedestrian is detected. The location of point of contact between the pedestrian and the road, e.g. a foot of the pedestrian is detected. If the feet are determined to be in one or more likely vehicle paths then the collision warning and/or collision control may be provided or not inhibited in a validation step 649. The predicted vehicle path may be projected onto the image and if the pedestrian's feet overlap the predicted path then the collision warning and/or collision control may be provided or not inhibited in a validation step 649. Alternatively, vehicle path may be predicted in world coordinates and the known feet location and the known camera perspective projection are used to locate the pedestrian in world coordinates.

The term "collision control signal" as used herein may include but is not limited to a control signal which initiates braking of the vehicle with or without driver intervention.

The term "collision warning" as used herein is a signal, typically audible, to the driver of the motor vehicle that driver intervention may be required to prevent a collision.

The indefinite articles "a", "an" is used herein, such as "an image", "a rectangular region" have the meaning of "one or more" that is "one or more images" or "one or more rectangular regions".

The term "validation" and "verification" are used herein interchangeably.

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. A computerized method using a camera mountable in a motor vehicle, the method comprising:
   acquiring a plurality of image frames from the camera with a known time interval;
   detecting an image patch in at least one of the image frames, wherein the image patch includes a candidate image of a pedestrian in the field of view of the camera;
   responsive to the motor vehicle moving forward, tracking optical flow between the image frames of an image point of the pedestrian;
   from horizontal image motion of the tracked point of the pedestrian relative to the horizontal image coordinate of the focus of expansion in an image space, computing physical lateral motion of the pedestrian responsive to longitudinal distance to the pedestrian in a physical space; and
   estimating the lateral position of the pedestrian at a time-to-collision from the physical lateral motion of the pedestrian.

2. The method of claim 1, further comprising
   determining a first time-to-collision based on the longitudinal distance to the pedestrian and a speed of the motor vehicle and comparing the first time-to-collision to a threshold; and
   determining a second time-to-collision based on optical flow of the image patch and comparing the second time-to-collision to a threshold.

3. The method of claim 2, further comprising
   when the first and second times to collision are of similar value and both less than the respective thresholds, providing a warning or issuing a control signal; or inhibiting a warning or inhibiting a control signal if the motor vehicle when the first and second times to collision are not of similar value and not both less than the respective thresholds.

4. The method of claim 2, further comprising:
   for a plurality of models selected from the group consisting of: (i) a road surface model wherein a portion of the image points is modeled to be imaged from a road surface (ii) vertical surface model wherein a portion of the image points is modeled to be imaged from a substantially vertical object and (iii) a mixed model wherein a first portion of the image points is modeled to be imaged from a road surface and a second portion of the image points is modeled to be imaged from a substantially vertical object, fitting the tracked optical flow of at least a portion of the image points to produce a plurality of fits to the models;
   using at least a portion of the image points, scoring the fits of the tracked optical flow to the respective models to produce respective scores; and
   determining if a collision is expected and the second time-to-collision by selecting the model with a score which corresponds to a best fit of the image points to the tracked optical flow.

5. The method of claim 4, further comprising:
   determining that a collision is expected based on the best fit of the image points to the tracked optical flow corresponding to the vertical surface model or the mixed model.

6. The method of claim 1, further comprising
   providing a collision warning or a collision prevention control signal if the pedestrian is on the far side of a curb or a lane mark and is crossing the curb or the lane mark; or
   inhibiting a collision warning or a collision prevention control signal if the pedestrian is on the far side of a curb or a lane mark and the pedestrian is not crossing the curb or the lane mark.

7. The method of claim 1, further comprising:
   predicting at least two most likely paths of the host vehicle;
   computing a region of intersection of said at least two paths;
   determining whether the pedestrian is inside or moving towards said region of intersection; and
   providing a collision warning signal or a collision control signal when the pedestrian is inside or moving towards said region of intersection; or inhibiting a collision warning signal or a collision control signal when the pedestrian is not inside and not moving towards said region of intersection.

8. The method of claim 1, further comprising:
   inputting or computing from the image frames a yaw rate of the motor vehicle; and
   estimating from the yaw rate the horizontal image coordinate of the focus of expansion.

9. A system comprising:
   a camera mountable in a motor vehicle; and
   a processor mountable in the motor vehicle, wherein the processor is operably connectable to the camera;
   wherein the processor is configured to:
   acquire a plurality of image frames from the camera with a known time interval;

detect an image patch in at least one of the image frames, wherein the image patch includes a candidate image of a pedestrian in the field of view of the camera;

responsive to the forward motion of the motor vehicle, track optical flow between the image frames of an image point of the pedestrian;

from horizontal image motion of the tracked point of the pedestrian relative to the horizontal image coordinate of the focus of expansion in an image space, compute physical lateral motion of the pedestrian responsive to longitudinal distance to the pedestrian in a physical space; and estimate the lateral position of the pedestrian at a time-to-collision from the physical lateral motion of the pedestrian.

10. The system according to claim 9, wherein the processor is further configured to:

determine a first time-to-collision based on the longitudinal distance to the pedestrian and a speed of the motor vehicle and compare the first time-to-collision to a threshold; and determine a second time-to-collision based on optical flow of the image patch and comparing the second time-to-collision to a threshold.

11. The system of claim 10, wherein the processor is further configured to:

provide a warning or issue a control signal when the first and second times to collision are of similar value and both less than the respective thresholds; or when the first and second times to collision are not of similar value and not both less than the respective thresholds inhibit a warning or inhibit a control signal.

12. The system of claim 10, wherein the processor is further configured to:

for a plurality of models selected from the group consisting of: (i) a road surface model wherein a portion of the image points is modeled to be imaged from a road surface (ii) vertical surface model wherein a portion of the image points is modeled to be imaged from a substantially vertical object and (iii) a mixed model wherein a first portion of the image points is modeled to be imaged from a road surface and a second portion of the image points is modeled to be imaged from a substantially vertical object, fit the tracked optical flow of at least a portion of the image points to produce a plurality of fits to the models;

using at least a portion of the image points, score the fits of the tracked optical flow to the respective models to produce respective scores; and determine if a collision is expected and the second time-to-collision by selecting the model with a score which corresponds to a best fit of the image points to the tracked optical flow.

13. The system of claim 12, wherein the processor is further configured to:

determine that a collision is expected based on the best fit of the image points to the tracked optical flow corresponding to the vertical surface model or the mixed model.

14. The system of claim 9, wherein the processor is further configured to:

provide a collision warning or a collision prevention control signal if the pedestrian is on the far side of a curb or a lane mark and is crossing the curb or the lane mark; or inhibit a collision warning or a collision prevention control signal if the pedestrian is on the far side of a curb or a lane mark and the pedestrian is not crossing the curb or the lane mark.

15. The system of claim 9, wherein the processor is further configured to:

predict at least two most likely paths of the host vehicle;

compute a region of intersection of said at least two paths;

determine whether the pedestrian is inside or moving towards said region of intersection; and provide a collision warning signal or a collision control signal when the pedestrian is inside or moving towards said region of intersection; or when the pedestrian is not inside and not moving towards said region of intersection, inhibit a collision warning signal or a collision control signal.

16. The system of claim 9, wherein the processor is further configured to:

input or compute from the image frames a yaw rate of the motor vehicle; and estimate from the yaw rate the horizontal image coordinate of the focus of expansion.

* * * * *